United States Patent [19]
Parsons

[11] Patent Number: 4,870,872
[45] Date of Patent: Oct. 3, 1989

[54] CAM MECHANISMS

[75] Inventor: Bryan N. V. Parsons, Stoney Stanton, United Kingdom

[73] Assignee: Jaguar Cars Limited, United Kingdom

[21] Appl. No.: 235,239

[22] Filed: Aug. 23, 1988

[30] Foreign Application Priority Data

Aug. 25, 1987 [GB] United Kingdom ............... 8720052

[51] Int. Cl.⁴ .................. F16H 53/00; F01L 1/04
[52] U.S. Cl. ............................ 74/568 R; 123/90.17
[58] Field of Search ............... 74/567, 568 R, 568 T, 74/568 M, 838, 574; 123/90.6, 90.17

[56] References Cited

U.S. PATENT DOCUMENTS

| | | | |
|---|---|---|---|
| 1,798,185 | 3/1931 | Burnett | 74/568 R |
| 2,213,994 | 9/1940 | Rankin | 74/568 R |
| 4,498,352 | 2/1985 | Hedelin | 74/568 R |

FOREIGN PATENT DOCUMENTS

| | | |
|---|---|---|
| 3234639 | 3/1984 | Fed. Rep. of Germany ... 123/90.17 |
| 3234640 | 3/1984 | Fed. Rep. of Germany ..... 123/90.6 |
| 59-155514 | 9/1984 | Japan ................................. 123/90.17 |
| 60-162004 | 8/1985 | Japan .................................. 123/90.6 |
| 649192 | 1/1951 | United Kingdom . |
| 1090500 | 11/1967 | United Kingdom . |

Primary Examiner—Rodney M. Lindsey
Attorney, Agent, or Firm—Davis, Bujold & Streck

[57] ABSTRACT

A cam mechanism includes a cam shaft, a cam mounted on said cam shaft, the cam being capable of limited relative rotation with respect to the cam shaft and damping means being provided to control the extent of rotation of the cam relative to the cam shaft as a function of the speed of rotation of the cam shaft.

5 Claims, 3 Drawing Sheets

CAM MECHANISMS

BACKGROUND TO THE INVENTION

The present invention relates to cam mechanisms and in particular, although not exclusively, to cam mechanisms used to control the inlet and exhaust valves of an internal combustion engine.

Modern high performance internal combustion engines have been developed to give a maximum power output at high engine speeds. In order to achieve this, the profile of the cam controlling opening and closing of the valves is designed to give high lift with long duration, in order to encourage gas flow at high speeds.

With such designs, the gas flow at low engine speeds is very much compromised. Under such conditions, incoming air is spilled back into the manifold due to late closing of the inlet valve, producing a corresponding reduction in the torque output available at low speeds. Also, the exhaust gas is released too early, reducing the expansion ratio of the engine and hence its efficiency. Furthermore, the overlap period where both inlet and exhaust valves are open is too large and allows free flow of air and fuel through the exhaust valve, thus causing emission problems.

The present invention provides a cam mechanism which may be adjusted in accordance with the engine speed, to vary the duration of opening of the valve.

SUMMARY OF THE INVENTION

According to one aspect of the present invention, a cam mechanism includes; a cam shaft; a cam mounted on said shaft and rotatable relative thereto; and means for restricting relative rotation of the cam with respect to the shaft, said means controlling the angular extent of rotation of the cam relative to the shaft as a function of the speed of rotation of the shaft.

Various embodiments of the invention are now described, by way of example only, with reference to the accompanying drawings, in which:

DESCRIPTION OF PREFERRED EMBODIMENTS

Figure 1:
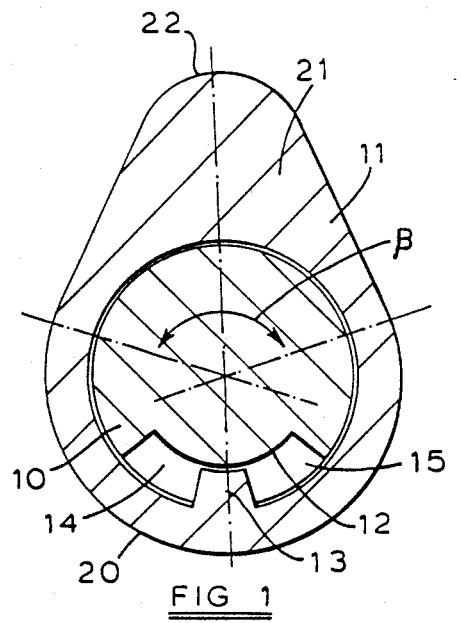
FIG. 1 illustrates in cross section, a cam mechanism according to the present invention.

The cam mechanism illustrated in FIGS. 1 and 2, comprises a cam shaft 10 with a cam 11 rotatably mounted thereon. A circumferentially extending arcuate groove 12 is provided in a portion of the shaft 10 engaged by the cam 11. A projection 13 on the internal diameter of the cam 11 extends into the arcuate groove 12. The projection 13 is dimensioned to conform closely with the width and depth of groove 12 but is significantly narrower angularly, so that it divides the arcuate groove 12 into two chambers 14 and 15 and permits limited relative rotation of the cam 11 with respect to the shaft 10.

The chambers 14 and 15 are filled with a damping medium. Conveniently, the damping medium may be a suitable elastomeric composition, blocks of which may be positioned between the projection 13 and the angular ends of the groove 12. Alternatively, if the cam 11 is sealed on both sides with respect to shaft 10, the chambers may be filled with damping fluid, so that upon movement of the cam 11 with respect to the shaft 10, fluid will be forced from one chamber 14 between the surfaces of the internal diameter of the cam 11 and shaft 10, into the other chamber 15 to produce a damping effect. By this means, the damping fluid may also serve to lubricate the surfaces of the internal diameter of the cam 11 and shaft 10. Alternatively, a restricted orifice may be provided through the projection 13 to permit damping fluid to be forced from one chamber to the other.

The cam 11 of the mechanism described above will typically operate against a bucket follower 17, in conventional manner, to open and close a poppet valve (not shown). However, the cam 11 may operate against other follower means.

Figures 2A, 2B, 2C:
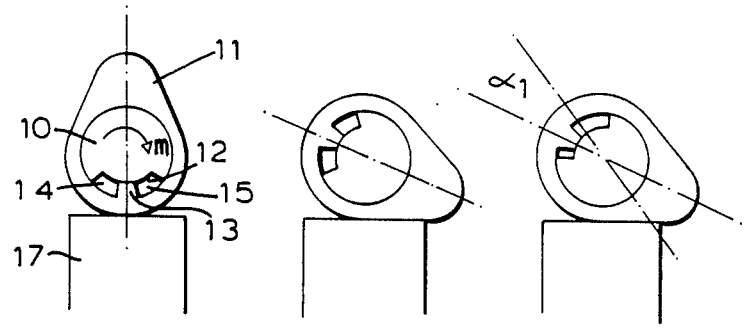
FIGS. 2A to 2F show sequential positions of the cam mechanism illustrated in FIG. 1, as the cam shaft rotates.
Figures 2D, 2E, 2F:
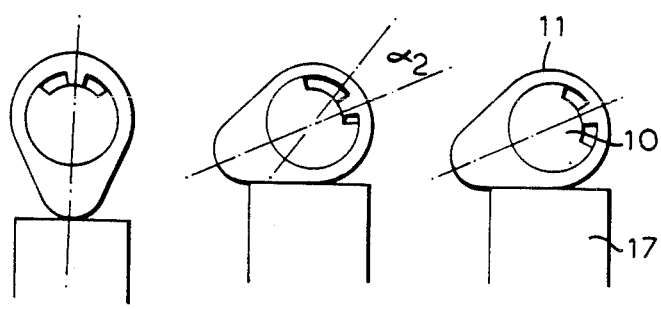

A typical operating cycle of the cam mechanism described above is illustrated in FIGS. 2A to 2F. Starting at the position illustrated in FIG. 2A, where the base circle portion 20 of the cam 11 engages the follower 17, the cam 11 will rotate with the shaft 10 in the direction of arrow M, until the cam lobe 21 comes into engagement with the cam follower 17 as shown in FIG. 2B. Upon continued rotation the cam shaft 10 will rotate relative to the cam 11 until after a relative rotation of angle $\alpha$, as illustrated in FIG. 2C, the force produced by the damping means opposing movement of the projection 13 in groove 12 will be sufficient to overcome the force required to move the cam follower 17 and associated poppet valve assembly. The cam 11 will then rotate with the cam shaft 10 and will depress the cam follower 17. As the cam 11 moves past the position illustrated in FIG. 2D, in which the nose 22 of the cam lobe 21 engages the follower 17, the force exerted by the return means of the poppet valve assembly will cause the cam 11 to flip over and move relative to the shaft 10 until the damping force is again equal to and opposes the force exerted by the cam follower 17 and associated poppet valve assembly. The cam 11 then continues to rotate with cam shaft 10 until the point illustrated in FIG. 2E where the junction between the cam lobe 21 and base circle diameter 20 engages the cam follower. The shaft 10 will then rotate relative to cam 11 through angle $\alpha_2$ until the damping forces acting on projection 13 have been substantially equalised, at the position illustrated in FIG. 2F and the cam 11 will then rotate with the shaft 10 back to the position illustrated in FIG. 2A.

It will be appreciated that while the lobe formation 21 of the cam 11 subtends an angle $\beta$, because of movement of the cam 11 relative to the shaft 10, the duration of movement of the cam follower is equal to an angle $\beta-\alpha,-\alpha_2$ where angles $\alpha$, and $\alpha_2$ are the angles of relative movement between the cam 11 and shaft 10 between the positions illustrated in FIGS. 2B and 2C and FIGS. 2E and 2F respectively.

The force produced by the damping means depends upon the speed at which the shaft 10 moves relative to the cam 11 and hence the engine speed, and while the force required to accelerate the cam follower and associated valve assembly also increases, by selection of suitable damping means, the displacement of the cam 11 relative to the shaft 10 represented by the angles $\alpha$, and $\alpha_2$ may be reduced as the speed of the engine increases, thus increasing the proportion of each revolution for which the valve will be open.

With the above construction of cam mechanism, several cams 11 may be provided on one cam shaft 10. In order to facilitate manufacture of such arrangements and also for assembly purposes, the arcuate grooves 12 for each cam mechanism may be formed by one or more grooves extending axially of the shaft 10. The axial grooves may then be closed on either side of each cam 11 to define the arcuate grooves 12, by a suitably shaped washer and or sealing means, the washers, sealing means and cams 11 being located in appropriate axial position on the shaft by means of circlips or other suitable means.

Figure 3:
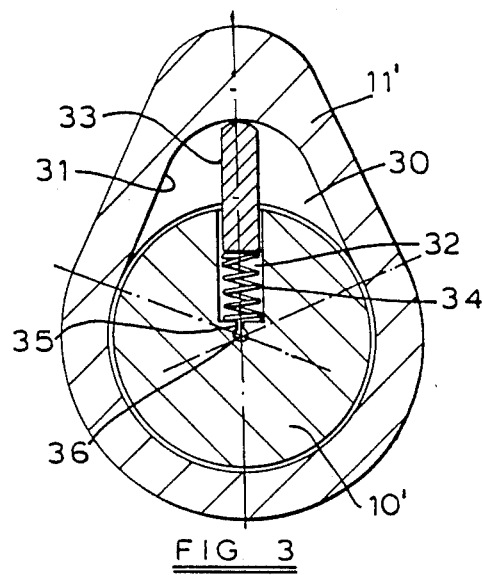
FIG. 3 illustrates in cross section an alternative form of cam mechanism according to the present invention.
Figure 4:
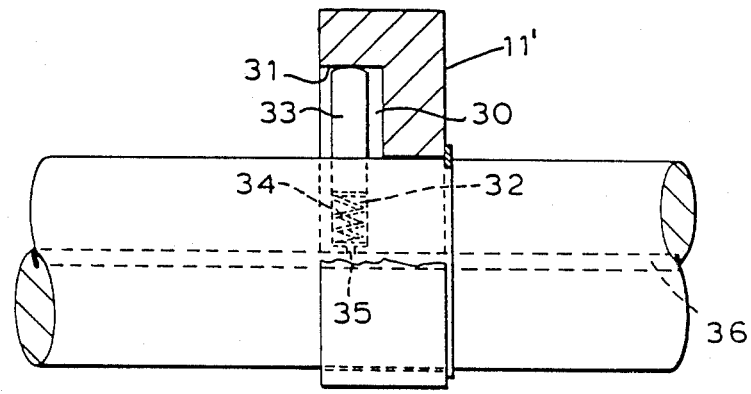
FIG. 4 shows a part sectional side elevation of the cam mechanism illustrated in FIG. 3.

In the alternative construction illustrated in FIGS. 3 and 4, the cam 11 is again rotatively mounted on cam shaft 10'. A recess 30 is provided on one side face of the cam 11'. The recess 30 is defined by a curved wall 31 which is parallel to the axis of the shaft 10', and opens to the internal diameter of the cam 11', the radial depth of the recess 30 decreasing in both directions from a central position.

A radial bore 32 is provided in the shaft 10' and a plunger 33 is slidably located and sealed in the bore 32, spring means 34 being provided to urge the plunger 33 into engagement with the wall 31 of recess 30. The radial bore 32 is connected via a restricted orifice 35 and axial bore 36 to a reservoir for damping fluid (not shown).

With this arrangement, relative rotation is permitted between the cam 11' and shaft 10', the plunger 33 being depressed into the radial bore 32 by engagement with surface 31. This relative rotation is thus opposed by spring means 34 and by the damping force produced as fluid is expelled from the radial bore 32, through the restricted orifice 35. As the damping force will again be dependent upon engine speed, the mechanism described above will operate in a manner similar to the mechanism illustrated in FIGS. 1 and 2 and described with reference to FIGS. 2A to 2F.

As with the mechanism described with reference to FIGS. 1 and 2, several cam mechanisms of the form described with reference to FIGS. 3 and 4 may be provided on a single cam shaft, the radial bores 32 of each cam mechanism being connected to a common damping fluid reservoir.

Using a similar construction to that illustrated in FIGS. 3 and 4, but connecting the axial bore 36 to a source of hydraulic fluid, the pressure of which may be controlled in relationship to the speed of the engine, the cam 11' may be locked relative to the shaft 10' at a particular engine speed, so that variation in the valve timing will only occur below that particular engine speed.

Figure 5:
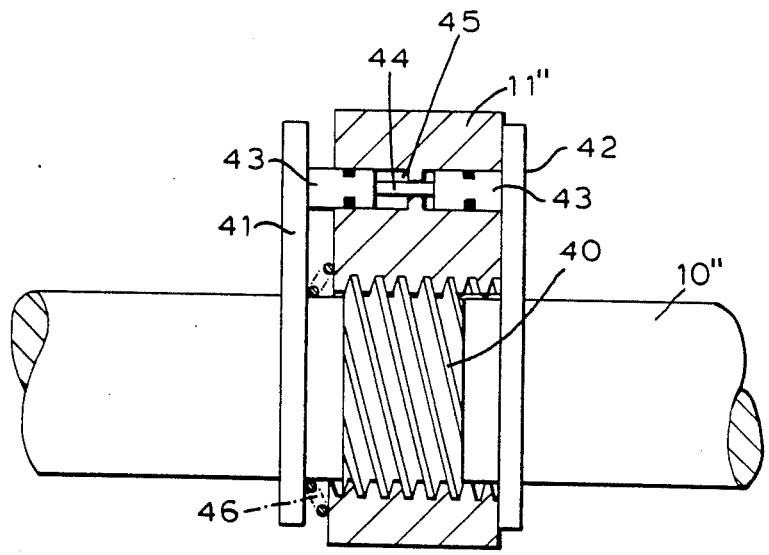
FIG. 5 illustrates in cross-section a further cam mechanism in accordance with the present invention.

In the embodiment illustrated in FIG. 5, the cam 11' is mounted on cam shaft 10' on a multi-start helical thread 40. A pair of plates 41 and 42 are mounted on the shaft 10' for rotation therewith, on either side of cam 11'. The axial separation of the plates 41 and 42 is greater than the width of the cam 11', so that the cam 11' is capable of limited axial movement between plates 41 and 42 on thread 40.

A pair of plungers 43 are interconnected by rod 44 and are slidingly sealed in a stepped bore 45 through the cam 11', so that the plungers 43 engage plates 41 and 42. The rod 44 passes through a reduced diameter portion of bore 45, which provides a restricted connecting passageway between the larger diameter portions of bore 45. The chamber formed by bore 45 between plungers 43 is filled with hydraulic fluid. A spring 46 acts between plate 41 and the cam 11' to bias the cam 11' into engagement with the other plate 42.

As cam 11' rotates in engagement with a cam follower, rotation of the cam 11' with respect to the shaft 10' as the lobe formation moves into engagement with the cam follower is prevented by engagement of the cam 11' with plate 42. However, after the cam has passed over top dead centre, the force of the valve spring will cause the cam 11' to accelerate relative to the shaft 10' causing it to rotate on the thread 40 and move towards plate 41. This movement causes the plungers 43 to move in bore 45 forcing fluid through the restricted passage, thus damping movement of the cam 11'. The damping effect is proportional to the speed of the engine and consequently as the engine speed increases the relative rotation between the cam 11' and shaft 10' decreases and the opening time of the valve increases. Biasing of the cam 11' towards plate 42 will cause the cam 11' to open the valve at the same position of the cam shaft 10' irrespective of engine speed, the closing position varying with engine speed. Alternatively the cam 11" could be biased centrally of the plates 41 and 42, so that both the opening and closing positions vary with engine speed, in similar manner to the embodiments illustrated in FIGS. 1 to 4.

Various modifications may be made without departing from the invention. For example, with the embodiments illustrated in FIGS. 1 to 4 the cam 11, 11', 11" may be biased to one extreme of its relative movement with respect to the shaft, so that only the closing position relative to the crank shaft will vary, in similar manner to that disclosed with reference to FIG. 5.

I claim:

1. A cam mechanism including a cam shaft; a cam mounted on a helical thread of said shaft and rotatable relative thereto; and means for restricting relative rotation of the cam with respect to the shaft, said means controlling the angular extent of rotation of the cam relative to the shaft as a function of the speed of rotation of the shaft.

2. A cam mechanism according to claim 1 in which the means for controlling the angular extent of rotation of the cam relative to the shaft includes damping means.

3. A cam mechanism according to claim 1 in which said restricting means include damping means controlling axial movement of the cam relative to the cam shaft.

4. A cam mechanism according to claim 3 in which the restricting means include a pair of plates mounted on the shaft, one on each side of the cam, the plates being spaced from the cam to permit limited axial movement thereof, the damping means acting between said pair of plates.

5. A cam mechanism according to claim 1 in which the cam is biased to one extremity of its movement relative to the shaft.

* * * * *